(12) United States Patent
Zhao et al.

(10) Patent No.: US 10,899,115 B2
(45) Date of Patent: Jan. 26, 2021

(54) FIBER REINFORCING POLYMER COMPOSITE AND ARTICLES MADE THEREFROM

(71) Applicant: PolyOne Corporation, Avon Lake, OH (US)

(72) Inventors: Lei Zhao, Birmingham, AL (US); Fayaz Ali, Hoover, AL (US); Paul Puckett, Lake Jackson, TX (US)

(73) Assignee: Avient Corporation, Avon Lake, OH (US)

( * ) Notice: Subject to any disclaimer, the term of this patent is extended or adjusted under 35 U.S.C. 154(b) by 136 days.

(21) Appl. No.: 16/318,329

(22) PCT Filed: Jul. 24, 2017

(86) PCT No.: PCT/US2017/043456
§ 371 (c)(1),
(2) Date: Jan. 16, 2019

(87) PCT Pub. No.: WO2018/022483
PCT Pub. Date: Feb. 1, 2018

(65) Prior Publication Data
US 2019/0283372 A1  Sep. 19, 2019

Related U.S. Application Data

(60) Provisional application No. 62/366,764, filed on Jul. 26, 2016.

(51) Int. Cl.
 B32B 27/08 (2006.01)
 B32B 27/20 (2006.01)
 B32B 27/22 (2006.01)
 B32B 27/30 (2006.01)
 C08J 5/04 (2006.01)
 B32B 27/18 (2006.01)

(52) U.S. Cl.
 CPC .............. *B32B 27/08* (2013.01); *B32B 27/18* (2013.01); *B32B 27/20* (2013.01); *B32B 27/22* (2013.01); *B32B 27/30* (2013.01); *B32B 27/304* (2013.01); *C08J 5/043* (2013.01); *C08J 2327/06* (2013.01); *C08J 2467/02* (2013.01)

(58) Field of Classification Search
 CPC ........ C08L 53/02; C08L 67/06; B29C 70/521; B29C 70/251; B32B 27/08; B32B 27/20; B32B 27/22; B32B 27/30; B32B 27/304; B32B 27/18; C08J 2327/06; C08J 2467/02; Y10T 428/249924; Y10T 428/249946; B29K 2105/0038; B29K 2027/06
 USPC ................. 428/297.4; 264/135, 171.13, 257; 156/166, 242, 180
 See application file for complete search history.

(56) References Cited

U.S. PATENT DOCUMENTS

| | | |
|---|---|---|
| 4,581,413 A | 4/1986 | Kim |
| 4,693,800 A | 9/1987 | Edwards et al. |
| 4,939,212 A | 7/1990 | Mikofalvy et al. |

(Continued)

*Primary Examiner* — Camie S Thompson
(74) *Attorney, Agent, or Firm* — John H. Hornickel; Michael J. Sambrook; Emily E. Vlasek

(57) ABSTRACT

Pultruded fiber reinforced polymer composite is disclosed, having a blend of conventional pultrusion resins and a rigidsol. The replacement of some of the conventional pultrusion resin with the rigidsol does not adversely affect mechanical properties but does enhance affinity of the pultruded part to a polyvinyl chloride-containing capstock.

14 Claims, 1 Drawing Sheet

(56) References Cited

U.S. PATENT DOCUMENTS

| | | | |
|---|---|---|---|
| 5,290,890 A | 3/1994 | Kim et al. | |
| 8,167,275 B1 * | 5/2012 | Bizzarri | E04H 17/20 |
| | | | 256/65.08 |
| 2008/0241533 A1 | 10/2008 | Dijt et al. | |
| 2009/0092821 A1 | 4/2009 | Dharan | |
| 2013/0053476 A1 * | 2/2013 | Hawrylko | C08J 5/045 |
| | | | 524/13 |
| 2013/0202873 A1 | 8/2013 | Mizuki et al. | |
| 2014/0154937 A1 | 6/2014 | Desbois et al. | |
| 2015/0004368 A1 | 1/2015 | Witzke et al. | |

* cited by examiner

US 10,899,115 B2

FIBER REINFORCING POLYMER COMPOSITE AND ARTICLES MADE THEREFROM

CLAIM OF PRIORITY

This application claims priority from U.S. Provisional Patent Application Ser. No. 62/366,764 and filed on Jul. 26, 2016, which is incorporated by reference.

FIELD OF THE INVENTION

This invention relates to use of a rigidsol to coat fiber for pultrusion of plastic articles.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products. Recently, an entire industry has arisen involving fiber reinforcement of polymer compounds, sometimes called "fiber reinforced polymer composites" (FRP composites).

FRP composites made by the standard pultrusion processes typically use thermoset resins, which allow high processing speed but do not allow good adhesion to thermoplastic capstocks.

Thermoplastic pultrusion, on the other hand, provides products with good bonding characteristics, but is slower to process and not commercially viable for some industrial scale applications.

SUMMARY OF THE INVENTION

What the art needs is a FRP composite which achieves all of good bonding or affinity characteristics to thermoplastic capstocks, excellent processing speed, and excellent heat distortion resistance, exceeding the limits of the testing machine.

The work disclosed herein solves that need in the art by using a specially-formulated thermoset-thermoplastic hybrid resin blend to achieve those desired balance of physical properties. For purposes of this invention, the rigidsol is considered a thermoplastic because it processes as a thermoplastic before curing.

One aspect of the invention is a fiber reinforcing polymer composite, comprising (a) reinforcing fiber; (b) rigidsol having a Brookfield viscosity (ASTM D1824 25° C. 20 rpm) of about 1200-3000 centipoise, and (c) pultrusion resin selected from the group consisting of polyesters, vinyl esters, epoxies, and combination thereof, wherein the reinforcing fiber is pultruded through the rigidsol and the pultrusion resin.

Another aspect of the invention is a pultruded shaped article made from the composite.

Another aspect of the invention is an assembly of the pultruded shaped article and a capstock having affinity for the shaped article.

Embodiments will become apparent from a description of the embodiments of the invention in relation to the following drawing.

EMBODIMENTS OF THE INVENTION

Fiber Reinforcement

Figure 1:
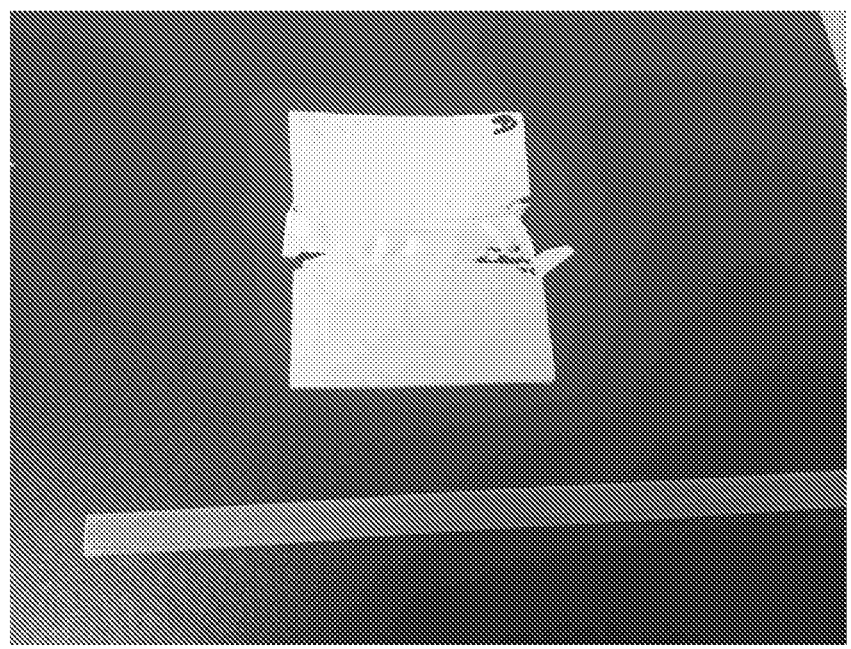
FIG. 1 is a photo of an experiment involving Comparative Example A.
Figure 2:
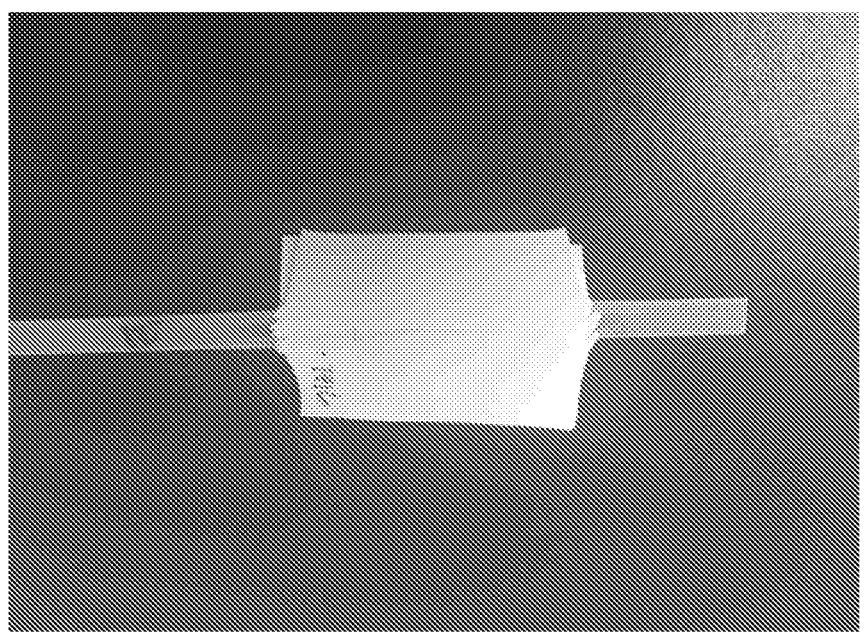
FIG. 2 is a photo of the same experiment involving Example 1.

Those persons having ordinary skill in the art of thermoset pultrusion will recognize candidates for fiber reinforcement in the composites of the invention. Non-limiting examples of candidates for reinforcement fiber include glass, steel, carbon, polyaramide (Kevlar® fiber), silica carbide, quartz, cellulose, juke, hemp, sisal, basalt, and combinations thereof.

Of these candidates, there are several excellent choices for glass fiber, among them being S-2 glass, S-1 glass. ECR glass. A-R glass, D glass. R glass, and E glass, alone or in combination. Of these glass fiber commercial products, PPG Hybon 9312. PPG Hybon 2662, PFG 1712. Jushi E6DR30-312T, OC Advantex SE8400 LS and PPG Innofiber 2026 are particularly preferred because they have the following physical properties:

The range of diameter of each fiber can range from about 13 µm to about 35 µm and preferably from about 13 µm to about 28 µm.

The yield of each roving of fibers can range from about 52 yield (9600 tex) to about 1650 yield (300 tex).

Tensile strength (ASTM D2343) can range from about 300 Kilopounds per square inch (Ksi) to about 450 Ksi and preferably from about 350 Ksi to about 400 Ksi.

Tensile Modulus (ASTM D2343) can range from about 10 Megapounds per square inch (Msi) to about 12 Msi and preferably from about 10.5 Msi to about 11.5 Msi.

Tensile Strain (ASTM D2343) can range from about 2% to about 4% and preferably from about 2.5% to about 3.5%.

Conventional Pultrusion Resin

DION® 31020 is a high reactivity isophthalic polyester resin designed for the pultrusion process. This resin is formulated for pultruded composites up to ⅜" thick with glossy, fiber-free surfaces at fast line speeds. The resin has high Heat Distortion Temperature, excellent chemical and water resistance, good mechanical property retention at elevated temperatures, 100% compatibility with polyvinyl acetate, fast line speeds, high gloss, and consistent batch to batch performance.

Other conventional pultrusion resin candidates include polyesters, vinyl esters, and epoxies which become thermoset upon initiation during the pultrusion two zone manufacturing process. Commercially favored conventional resins include without limitation Aropol L-2450 and Aropol L-2452 unsaturated polyester resins, DERAKANE 411 and DERAKANE 440 epoxy vinyl ester resins, and HETRON D-1398 and HETRON D-1222 epoxy vinyl ester resins, all from Ashland Inc.; and Dion 31020, Dion31022, Dion 31069, Dion 31071, Dion 31052, and Dion 31830 vinyl ester resins from Reichold LLC.

Rigidsol Resin

Rigidsols useful in the present invention are those which are formed from dispersion-, microsuspension-, and emulsion-grade poly(vinyl chloride) (PVC) resins (homopolymers and copolymers) and plasticizers. Exemplary dispersion-grade PVC resins are disclosed in U.S. Pat. Nos. 4,581,413; 4,693,800; 4,939,212; and 5.290.890, among many others such as those referenced in the above four patents.

Desirably, the rigidsols are formulated to be rigid, rather than flexible, upon fusing of the PVC resin particles. Sometimes, these type of rigidsols are called "rigidsols" in order to emphasize that, while they have begun their use as a flowable resin, after fusing, they are a rigid plastic.

Rigidsols desirable in the present invention are those which, when fused, have a Shore D hardness (ASTM D2240-02 after 15 seconds) of more than about 60 and preferably more than 70. Also, desirable rigidsols, when fused, can have a Tensile Strength (ASTM D638) of more than about 7000 psi (48 MPa) and preferably more than 8000 or 9000 psi (55-62 MPa). Finally, the desirable rigidsols, when fused, exhibit only a small amount of Percent Elongation (ASTM D638) of less than 10% and preferably less than 5%.

Presently preferred rigidsols for use in the present invention are those commercially available from PolyOne Corporation as Geon™ MB2756 natural rigidsol acrylate-modified polyvinyl chloride, and Zeon Technologies (Salisbury, N.C., USA) as Pultuff™ brand rigidsol resins for structural composite applications.

Suitable grades are identified as rigid, non-phthalated rigidsols which are low in viscosity (Brookfield viscosities (ASTM D1824 25° C., 20 rpm) of about 1200-3000 centipoise).

Optional Functional Additives

Pultrusion formulations usually include more than resin and plasticizer. Non-limiting examples of functional additives, which can also be present in the pultrusion formulations for this invention, include heat stabilizers, UV absorbers, fillers, release agents, biocides, initiators, pigments, and combinations thereof. Such functional additives are available from a number of commercial sources known to those working the plastics industry and might also be present in commercially available rigidsols, such as the Geon™ and Pultuff™ resins identified above.

Table 1 shows acceptable, desirable, and preferable ranges of ingredients useful in the present invention, all expressed in weight percent (wt. %) of the entire mixture. The mixture can comprise, consist essentially of, or consist of these ingredients. Any number between the ends of the ranges is also contemplated as an end of a range, such that all possible combinations are contemplated within the possibilities of Table 1 as candidate mixtures for use in this invention.

TABLE 1

| Ingredient (Wt. %) | Acceptable Range | Preferred Range |
| --- | --- | --- |
| Rigidsol | 20-30 | 23-27 |
| Conventional Pultrusion Resin | 5-7 | 6-6.5 |
| Reinforcing Fiber | 60-70 | 63-67 |
| Clay | 2-4 | 2-4 |
| Optional Additives | <2 | <2 |

The pultrusion process is a continuous forming process, in which resin impregnated reinforcements enter a die, whereby they are formed into a net shape and exit the die cavity, preferably as finished parts. For thermoset pultrusion process, all of the curing of resin should take place inside the die.

Usefulness of the Invention

Flexural Modulus (ASTM D790) of FRP unidirectional composite of the present invention can be at least 4 Msi (27.5 GPa), can exceed 7 Msi (48.2 GPa), and has been found with glass fiber loading of 80 weight percent to exceed 8 Msi (55.2 GPa).

Heat distortion temperature exceeds 75° C. and can exceed 87° C. or even 100° C. at the higher loadings of glass fiber in the FRP composite.

Structural strength of FRP composite of the present invention allows FRP composite to become useful in heavy load-bearing structural capacities. The use of the rigidsol does not detract from that load-bearing property but adds an affinity for PVC-containing capstock that conventional thermoset FRP composite formulations do not possess.

Non-limiting examples of FRP composite usage include exposed wall studs, truss supports, beams, windows, doors, fascia, siding, trim, etc. in addition to the conventional uses of FRP composite in construction, such as decking, fencing, ornamental non-load-bearing appurtenances, etc. Any of these conventional products and parts made from FRP composite formulations can now benefit from the affinity the FRP composite formulation in such shapes can have with PVC-containing capstock.

Appearance of FRP composite of the present invention can be determined by the profile of the extrusion die from which the FRP composite emerges after coating the pultruded fiber with the blend of the two resins, one thermoset and the other curable thermoplastic. Generally, the FRP composite has smooth surface, but one can also include other additives to provide a finely mottled non-woven fiber appearance.

Customers can also request a variety of custom shapes and sizes of pultruded FRP composite formulation to best suit their needs. Depending upon the desired stiffness, weight, strength, flex, density, and tensile requirements, persons having ordinary skill in the art without undue experimentation can work to develop the customized FRP composite. Composite products can be fabricated using glass fiber-reinforced plastics either in a mat/roving (MR-GFRP) or unidirectional (U-GFRP) design. High performance carbon fiber unidirectional reinforcements are also available.

EXAMPLES

Table 2 shows the ingredients to prepare pultruded glass fiber reinforcing polymer composites. A conventional pultrusion resin serves as Comparative Example A with that resin blended with rigidsol to demonstrate the value of the invention of that blend of pultrusion resins.

TABLE 2

| Ingredients in lbs. and ml. | Comp. Ex. A | Example 1 |
| --- | --- | --- |
| GEON ™ MB2756 rigidsol (PolyOne) (lbs) | | 48 |
| DION 31020 isophthalic polyester (Reichold) (lbs) | 60 | 12 |
| HUBER G35 Calcium Carbonate Clay (Huber Engineered Materials) (lbs) | 6 | 6 |
| Int-PUL-24 pultrusion process aid (Axel Plastics) (lbs) | 0.6 | 0.6 |
| NOROX 420 peroxide high temperature initiator CAS# 13122-18-4 (United Initiators) (ml) | 120 | 120 |
| TBPB tertbutylperoxybenzoate low temperature initiator CAS# 614-45-9 (United Initiators) (ml) | 90 | 90 |
| Continuous Roving of Glass Fiber - Hybon CR 2026-113y (PPG) | 7 ends pulled through H-24 Die | |
| Glass Weight % in Final Part | 65 | 65 |

TABLE 2-continued

| Ingredients in lbs. and ml. | Comp. Ex. A | Example 1 |
|---|---|---|
| Die | H-24 Die, 30" in Length | |
| Die Shape | Flat Bar | |
| Die Dimensions | 0.090" × 0.390" | |
| Line Speed | 16"-80"/min | |
| Die Temperature Settings (° F.) (Zone 1 - Front/Zone 2 - Back) | 290/365 | |
| Heat Deflection Temperature (ASTM D648) at 264 psi | >300° C. (machine limit) | |

The only difference between the formulation and pultrusion of Comparative Example A and Example 1 was the replacement of 80% of the conventional pultrusion resin with rigidsol.

To test affinity of the pultrusion formulation to a polyvinyl chloride-containing capstock, a pultruded part made from the formulation in Comparative Example A having an area of 0.390 inches×0.090 inches (0.99 cm×0.23 cm) and then cut into a section 18 inches (46 cm) in length was compression molded with a polyvinyl chloride (PVC) sheet of 0.787 inches (2 mm) thickness made from Geon™ 87180 capstock. The compression molding temperature was sufficiently high enough to melt the PVC. The compression force was 30 tons (266,893 Newtons). The goal was to determine if the PVC sheet would bond or adhere to the pultruded part of Comparative Example A. Upon demolding, gravity caused the PVC sheet to immediately fall from the pultruded part. No evidence was evident of adhesion or bonding or other affinity between the two parts of different material composition. FIG. 1 shows the photo of the results.

The same affinity test was performed using the formulation of Example 1 in a pultruded part of the same size and shape. The same compression molding was used; the same molding temperature was used. Upon demolding, the PVC sheet could not be dislodged from the pultruded part even with average manual force applied.

Without being limited to a particular theory, it is believed that the presence of PVC-containing rigidsol in the surface of the pultrusion product permits, upon elevated temperature compression molding, at least a physical affinity of bonding of like materials (PVC of two types) at the interface between the PVC sheet and the PVC-containing pultruded part.

The implications of this simple comparison are not trivial. Using pultrusion manufacture of fiber reinforcing polymer parts which have an affinity for polyvinyl chloride permits greater versatile usage of both the pultruded part as a building and construction material, such as a window frame, and the PVC containing sheet serving as an aesthetic capstock.

For example, a building material can be an article containing the composite disclosed herein in a pultruded shape selected from the group consisting of wall studs, truss supports, beams, parts of windows, parts of doors, fascia, siding, trim, decking, fencing, and ornamental non-load-bearing appurtenances, all covered by a capstock of polyvinyl chloride.

Because the pultrusion technique can produce two dimensional parts of any conceivable length and because after pultrusion one can apply the PVC capstock to the pultruded part, large volume manufacturing of building and construction materials can occur, benefiting both supplier and customer.

The invention is not limited to the above embodiments. The claims follow.

What is claimed is:

1. A fiber reinforcing polymer composite, comprising:
   (a) reinforcing fiber
   (b) rigidsol having a Brookfield viscosity (ASTM D1824 25° C., 20 rpm) of about 1200—3000 centipoise, and
   (c) isophthalic polyester resin,
   wherein the reinforcing fiber is pultruded through the rigidsol and the isophthalic polyester resin.

2. The composite, according to claim 1, wherein the rigidsol, when fused as a resin, has
   (1) a Shore D hardness (ASTM D2240-02 after 15 seconds) of more than 60,
   (2) a Tensile Strength (ASTM D638) of more than about 48 MPa,
   (3) a Percent Elongation (ASTM D638) of less than 10%.

3. The composite of claim 1, wherein the reinforcing fiber is selected from the group consisting of glass, steel, carbon, polyaramide, silica carbide, quartz, cellulose, jute, hemp, sisal, basalt, and combinations thereof.

4. The composite of claim 3, wherein the glass fiber is selected from the group consisting of being S-2 glass, S-1 glass, ECR glass, A-R glass, D glass, R glass, E glass, and combinations thereof.

5. The composite of claim 1, wherein the diameter of each reinforcing fiber ranges from about 13 µm to about 35 µm.

6. The composite of claim 1, wherein the reinforcing fiber has
   (a) a yield for each roving of fibers ranging from about 52 yield to about 1650 yield;
   (b) a tensile strength (ASTM D2343) ranging from about 300 to about 450 Kilopounds per square inch;
   (c) a tensile Modulus (ASTM D2343) ranging from about 10 to about 12 Megapounds per square inch; and
   (d) a tensile Strain (ASTM D2343) ranging from about 2% to about 4%.

7. The composite of claim 1, wherein the composite further comprises heat stabilizers, UV absorbers, fillers, release agents, biocides, pigments, or combinations thereof.

8. The composite of claim 1, wherein the composite comprises 60-70 weight percent of reinforcing fiber, 20-30 weight percent of rigidsol, and 5-7 weight percent of isophthalic polyester resin.

9. A pultruded article shaped from the composite of claim 1.

10. The pultruded article of claim 9 laminated to a sheet containing polyvinyl chloride.

11. A laminate of an article of the composite of claim 1 and a sheet containing polyvinyl chloride, wherein the sheet is a capstock to the article.

12. The laminate of claim 11, wherein the article is pultruded into a building material.

13. The laminate of claim 12, wherein the building material is selected from the group consisting of wall studs, truss supports, beams, parts of windows, parts of doors, fascia, siding, trim, decking, fencing, and ornamental non-load-bearing appurtenances.

14. A building material made of a laminate of claim 11.

* * * * *